Patented July 10, 1951

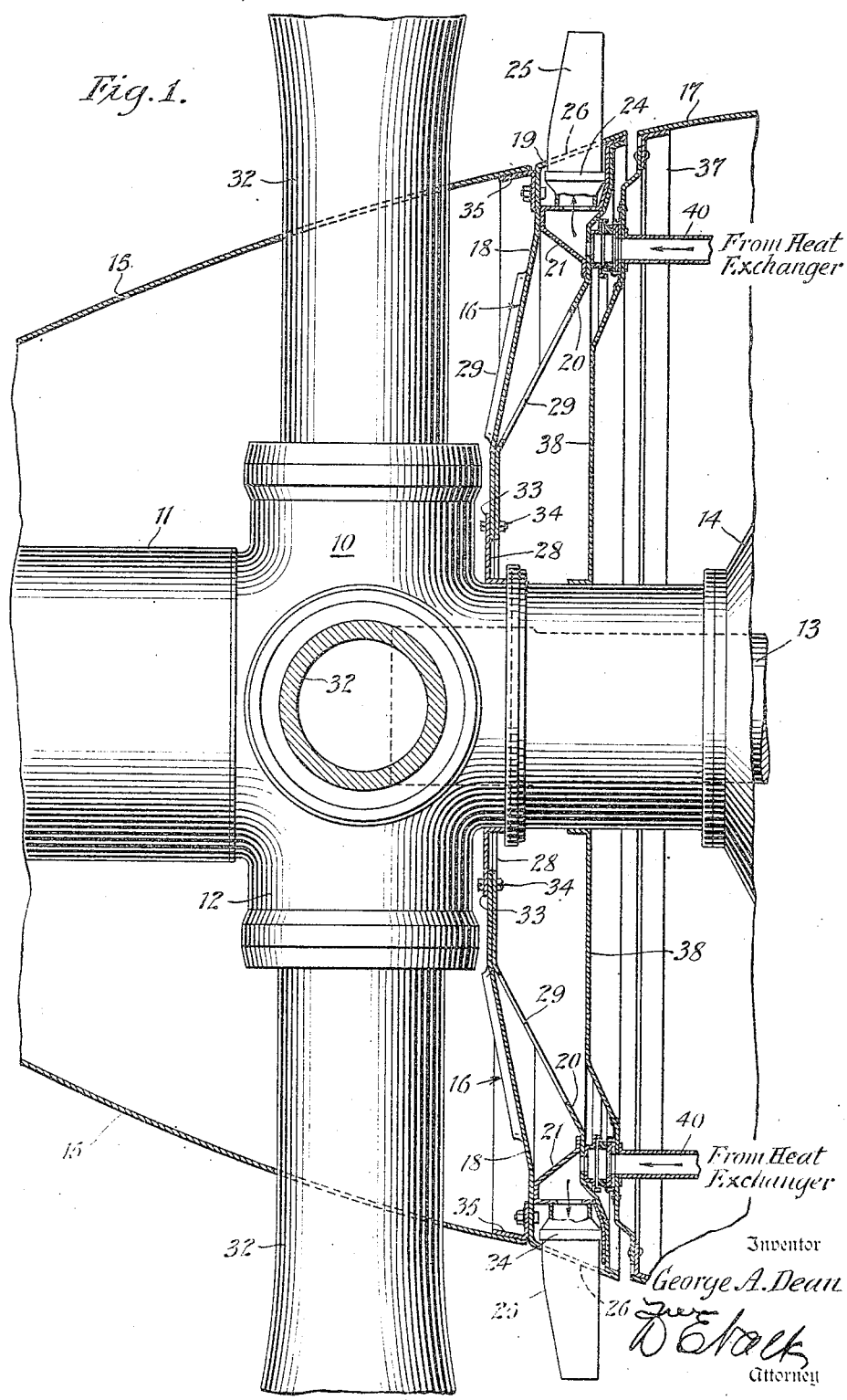

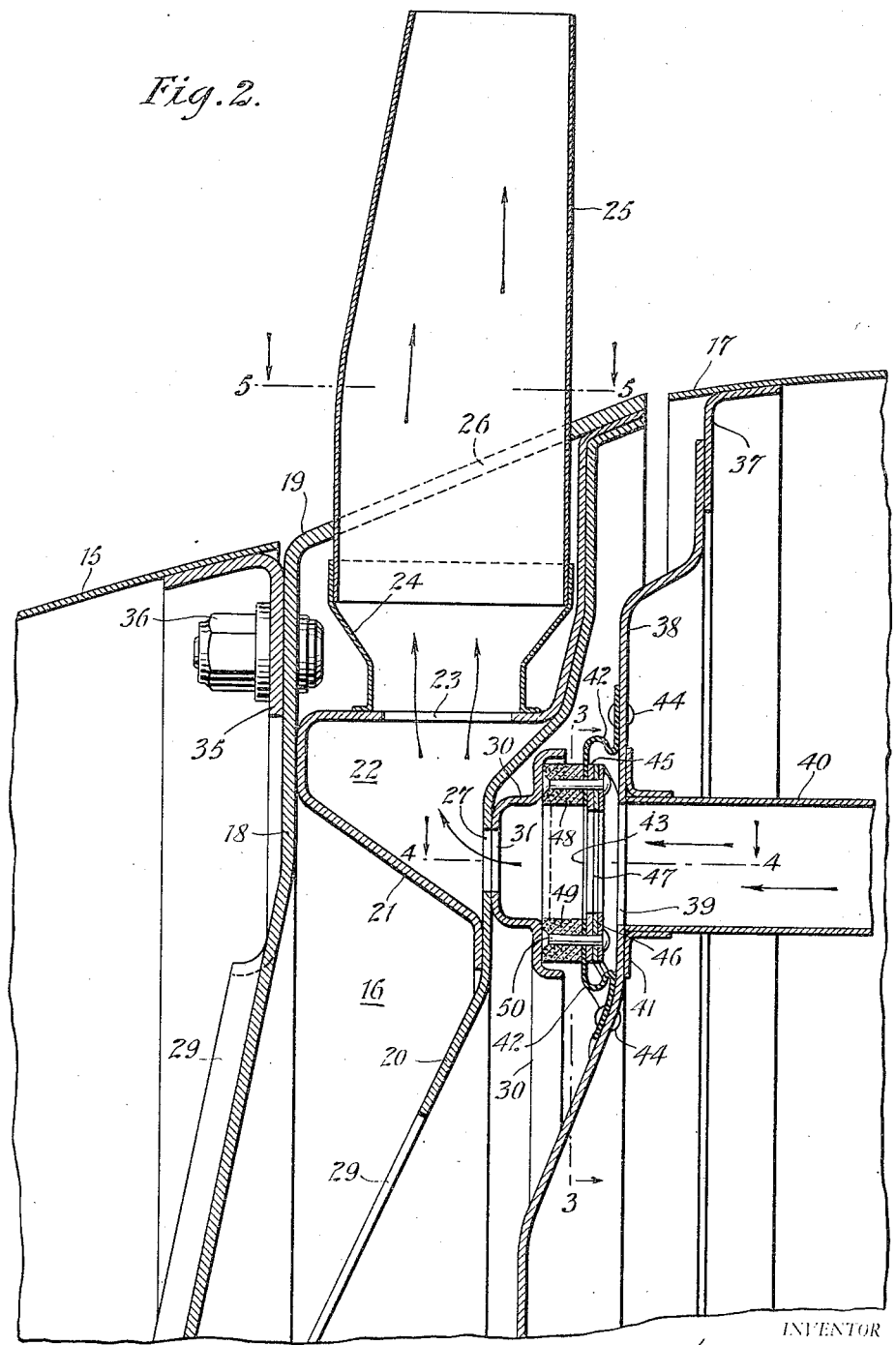

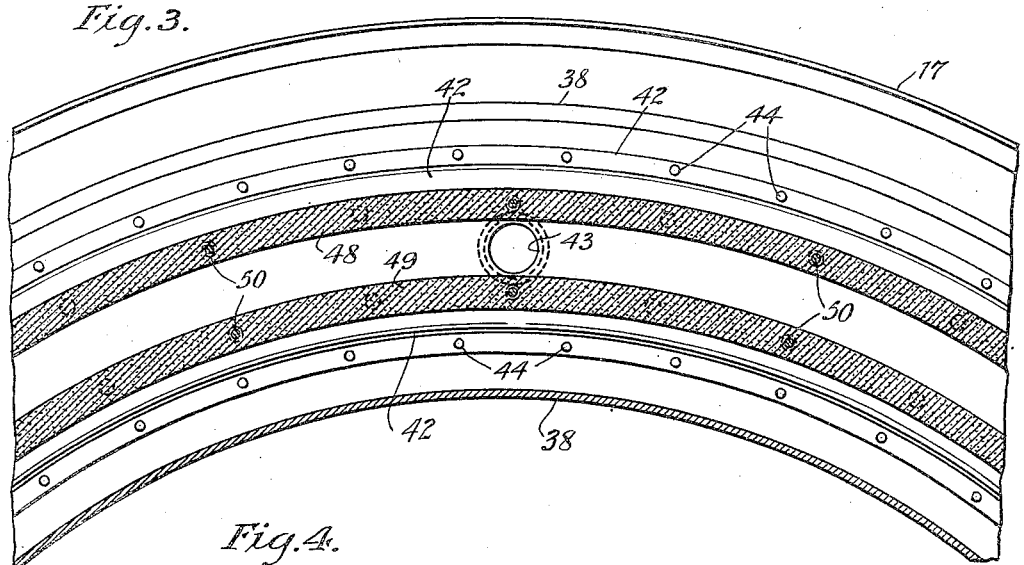
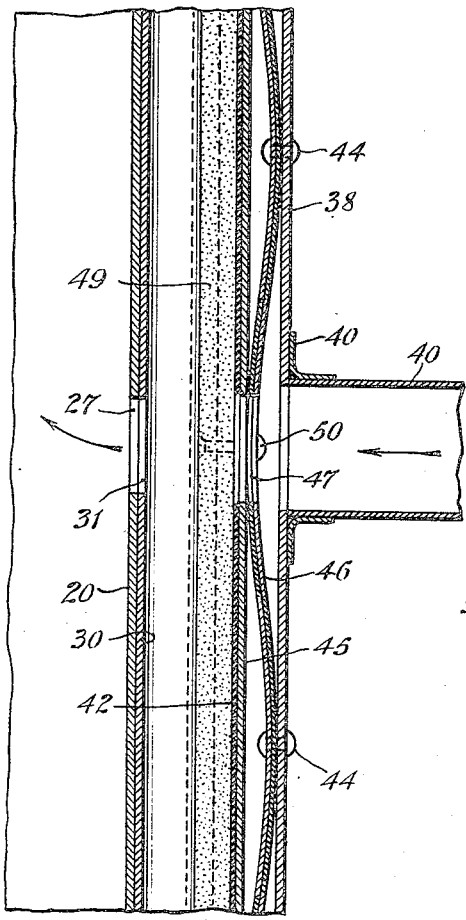
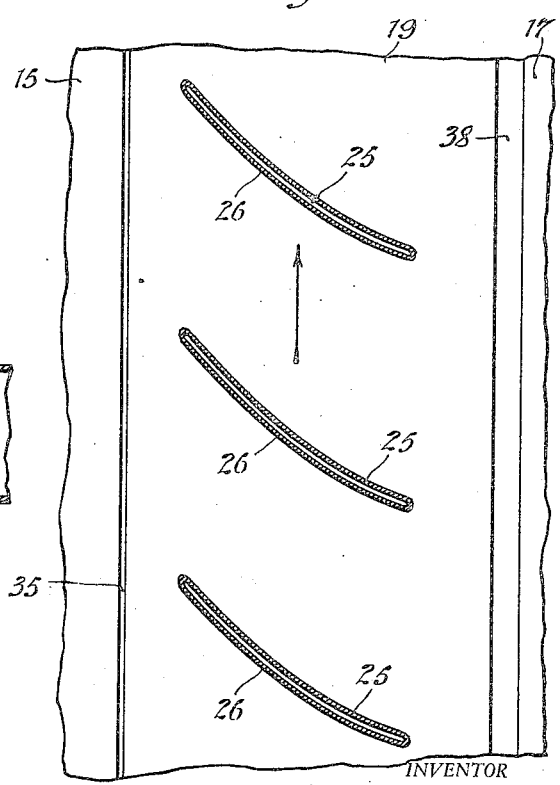

2,559,851

UNITED STATES PATENT OFFICE 2,559,851

TEMPERATURE RESPONSIVE COUPLING MEANS FOR RELATIVELY ROTATABLE CONDUIT SECTIONS

George A. Dean, Radburn, N. J., assignor to Curtiss-Wright Corporation, a corporation of Delaware Application November 6, 1944, Serial No. 562,193

14 Claims. (Cl. 244—134)

This invention relates to a system wherein a hot gaseous medium is supplied, for example, to a rotatable member of an aircraft. More particularly, the invention has reference to a conduit coupling element in said system whereby a supply line for a hot gaseous medium is automatically coupled to a rotatable member upon passage of a hot gaseous medium through said coupling element.

The principal object of the invention is to provide a conduit coupling element in a system for supplying a hot gaseous medium whereby said system is adapted to be opened or closed in response to temperature changes in said system.

A further object of the invention is to provide an automatic coupling between fixed passages or conduits and rotatable passages or conduits wherein the coupling means is responsive to a variation in temperature to move the fixed passages into or out of frictional contact with the rotatable passages or conduits.

Various other objects, advantages and features of the invention will become apparent from the following detailed description.

The invention resides in the fan blade de-icing or anti-icing means, the novel coupling construction and spinner bulkhead arrangement of the character hereinafter described and claimed.

For an understanding of the invention and for an illustration of one of the forms thereof, reference is to be had to the accompanying drawings, in which:

Figure 1 is a vertical sectional view illustrating the invention as applied to an aircraft propeller assembly;

Fig. 2 is an enlarged fragmentary sectional view;

Fig. 3 is a sectional view taken on the line 3—3 of Fig. 2;

Fig. 4 is a sectional view taken on the line 4—4 of Fig. 2; and

Fig. 5 is a sectional view taken on the line 5—5 of Fig. 2.

Referring to the drawings and to Fig. 1 in particular, an aircraft propeller assembly 10 including a pitch change motor housing 11 carried by the hub 12 thereof, is shown mounted on the drive shaft 13 protruding from the nose or front end of an engine 14 in conventional manner. A conical spinner shell 15 utilizable for streamlining the hub 12 and adjacent portions of the propeller assembly 10, is adapted to be mounted on the hub 12 by means of an engine cooling fan rotor 16 forming the rear bulkhead of the spinner 15 and adapted for thermal anti-icing or de-icing purposes, said fan rotor 16 being secured on and about the rear shoulder of the hub 12 whereby said hub, spinner and fan rotor are rotatable together as a streamlined unit in coaxial alinement with an engine cowling 17 of an aircraft structure as will be understood.

In accordance with the invention, the fan rotor 16 comprises a dished annular member 18 having a tapered or conical rim 19, a complementary dished annular member 20 being nested within said member 18 with a trough-forming ring member 21 interposed and secured therebetween in concentric relation therewith whereby said annular members 18 and 20 together with said member 21 form a circular chamber or conduit 22 within the fan rotor 16.

The peripheral surface of the trough-forming ring member 21 is provided with a plurality of angularly spaced openings 23 with a like number of radially arranged tubular blade-receiving sockets 24 suitably welded thereon in registration with the respective openings 23. As clearly shown in Figs. 1 and 2, a plurality of hollow fan blades 25 are secured in said sockets 24, as by welding for example, and extend, respectively, through a plurality of angularly spaced arcuate slots 26, provided therefor in the tapered rim 19 of the annular member 18, said slots 26 being formed at an angle whereby said blades 25 are set in a predetermined fixed pitch position. The side wall of the dished annular member 20 is provided with a plurality of angularly spaced openings 27 whereby to establish a plurality of annularly arranged inlet passages into the aforesaid annular chamber or conduit 22, these passages extending through the respective openings 23 formed in the outer surface of the member 20 and into and through the respective fan blades 25.

The annular members 18 and 20, forming the fan rotor 16, are dished or offset out of their plane of rotation, with the member 20 offset to a greater depth than the member 18 in order that the central area of the member 20 will abut the central area of the member 18 when the said members are pressed together. The offset portion of each of the members 18 and 20 is provided with a large central opening 28 and a plurality of relatively smaller openings 29 angularly spaced and circumferentially arranged about said central opening, the openings 29 being adapted to reduce the weight of said members and the central openings 28 to provide a clearance passage for the rear end of the propeller hub 12.

The fan rotor 16 is further provided with a trough-like collector ring 30 suitably welded to the rear face of the dished annular member 20 with a plurality of angularly spaced openings 31 therein disposed in alinement with the respective openings 27 in the annular member 20, whereby a gaseous medium may be introduced into the circular conduit or chamber 22 during rotation of the fan rotor 16.

As shown, the fan rotor 16 is secured on the propeller hub 12 in coaxial relation therewith and in spaced relation to the propeller blades 32 by means of a flanged disk 33 suitably secured on and about the rear end of the hub 12 with the rotor 16 in abutment with one face thereof and suitably secured by means of the bolts 34, for example, passing through said disk 33 and the dished members 18 and 20 forming the fan rotor housing as clearly shown in Fig. 1.

The spinner 15 is provided, within its base, with an inwardly flanged ring 35 suitably secured thereto as by welding, for example. The spinner 15 is secured to the front face of the fan rotor 16, in coaxial alinement therewith, by a plurality of suitable bolts 36 passing through said flanged ring 35 and the annular member 18 of the fan rotor 16. Thus, the spinner 15 and the rotor 16 are carried by the propeller hub 12 as a unit for rotation therewith, the tapered rim 19 of the said member 18 forming a continuation of the spinner surface into close proximity with the engine cowling 17 as clearly shown in Fig. 2.

Further in accordance with the invention, the engine cowling 17 is provided, interiorly thereof and adjacent its front edge, with an inwardly flanged ring member 37 suitably secured thereto as by welding. A dished annular member 38, provided with a central opening to permit passage over the nose of the engine 14 and serving as a bulkhead for attachment of said cowling 17 thereto, is also provided with a series of annularly arranged openings or apertures 39 spaced axially from but on the same radius as the respective openings or apertures 31 in the collector ring 30.

Means for passing any hot gaseous medium such as hot air, for example, from a heat exchanger associated with the engine exhaust system, not shown, consists of a plurality of annularly arranged conduits such as the pipes 40, for example, extending from the heat exchanger and terminating in the respective openings or apertures 39 in the dished annular member 38 where the pipes 40 are held by flanged coupling sleeves 41 suitably secured, as by welding, to said annular member 38 and to the pipes.

In order that a hot gaseous medium may be passed from the fixed conduits 40 into the rotatable collector ring 30 and the fan rotor 16, a temperature-responsive coupling means is interposed therebetween and supported by the aforesaid annular member 38 forming the bulkhead for the cowling 17. To this end, a bellows type annular member 42, formed preferably but not necessarily of leather and provided with a series of radial openings or apertures 43 corresponding to the number of supply conduits or pipes 40 and in axial alinement therewith, is secured to the outer face of the dished annular member 38, by means of rivets 44, in concentric relation with the fan rotor 16 and the said cowling 17. The leather bellows ring 42 is provided on its inner face with a metallic backing ring 45 and a plurality of concentrically arranged bimetallic rings 46, said rings having a plurality of angularly spaced openings or apertures 47 formed therein to permit passage of hot gases therethrough. On its outer face, the bellows ring 42 is provided with a pair of sealing rings 48 and 49 concentrically arranged one within the other and formed, preferably although not necessarily of compressed graphite for example. As best shown in Fig. 2, the backing ring 45, bimetallic rings 46 and the sealing rings 48 and 49 are suitably riveted, as in the zones 50, to the bellows ring 42 in concentric relation with said collector ring 30 whereby all of said elements are in axial alinement with the propeller hub 12.

While the bimetallic element 46 is shown in the form of a pair of concentrically arranged circular members, it is to be expressly understood that a plurality of segments of a circle, angularly spaced and secured independently of each other, may be utilized, in lieu of the circular members 46 to urge the sealing rings 48 and 49 into frictional contact with the collector ring 30 when subjected to a hot gaseous medium.

As hereinbefore mentioned, the conduits 40 are suitably connected to a heat exchanger associated with the engine exhaust system including an air inlet for said heat exchanger and a manually operable control valve, not shown, between said air inlet and heat exchanger whereby heated air may be passed into said conduits 40.

In the drawings, the invention has been illustrated as it would appear in operation, the arrows indicating the flow of a hot gaseous medium, passing from the conduits 40 into the temperature responsive coupling, into the fan rotor 16 and through the fan blades 25 to the atmosphere.

As thus shown, the heated air contacting the bimetallic rings 46 has caused said rings to expand or buckle in regions between the rivets 44, the leather bellows ring 42 to flex forwardly and the sealing rings 48 and 49 to be moved into frictional contact with the rotatable collector ring 30 whereby a substantially leak-proof juncture between the fixed conduits 40 and the rotatable collector ring 30 is established.

When it is not necessary or desirable to heat the fan blades 25 for anti-icing or de-icing purposes, the aforesaid control valve is closed and the supply of heated air thus cut off whereupon the bimetallic rings 46 contract or return to normal position and the sealing rings 48 and 49 thereby are withdrawn out of contact with the rotatable collector ring 30, breaking the frictional coupling therebetween.

From the foregoing, it will be readily apparent that the present invention provides a simple, efficient and reliable automatic coupling between a rotatable member and a series of fixed conduits or ports wherein the coupling comprises self-sealing and self-separating juncture-forming elements which are substantially leak-proof, when sealed, and self-lubricating. Morever, the coupling is of such character that substantial wear does not occur therein since sealing operation thereof is limited to intervals when de-icing or anti-icing the fan blades occurs.

Accordingly, from the foregoing description, it will be understood that, in the event that ice forms on the fan blades hereinbefore described, the operator may open the control valve, not shown, to thereby cause a hot gaseous medium to pass from the pipes 40 into the fan blades 25. As a result, the temperature of the said blades is elevated by the hot gaseous medium to thereby effectively dissipate ice which adheres thereto, at the same time closing the seal to prevent leakage of the hot gas thereat.

While the invention has been shown and described in connection with an engine cooling fan or rotor, it is to be expressly understood that the invention is also applicable to a system wherein a hot gaseous medium is introduced, directly or indirectly, into the hollow blades of an aircraft propeller assembly, propeller spinner, wings or rudders of a plane, or into the hollow blades of a sustaining rotor whereby the outer surface of such elements may also be protected against the formation of ice thereon or ice dissipated therefrom. Moreover, the invention is also applicable in systems where a temporary frictional coupling between a stationary conduit or passage and a rotatable member having a passage or chamber formed therein or a conduit connected thereto, is desirable.

In the appended claims, the expression "de-icing" shall be understood as describing true de-icing wherein ice is dissipated, which previously, had been formed on the fan blades and said expression shall also be considered as describing an operation wherein the fan blades are subjected to the action of a hot gaseous medium in order to positively prevent the formation of ice thereon.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a system for supplying a hot gaseous medium for de-icing or other purposes on an aircraft, conduit means for passing the hot gaseous medium toward a desired aircraft location, said conduit means comprising a fixed member and a rotatable member, said members being normally spaced from each other so that rotation of the rotatable member proceeds without substantial contact at the adjacent surface of the fixed member, and means responsive to the elevated temperature of said hot medium as it flows in said means for sealing said members to produce substantially a sealed running joint at said surface.

2. In a system for supplying a hot gaseous medium for de-icing or other purposes on an aircraft, conduit means for passing the hot gaseous medium toward a desired aircraft location, said conduit means comprising a fixed member and a rotatable member, said members being normally spaced from each other so that rotation of the rotatable member proceeds without substantial contact at the adjacent surface of the fixed member, and temperature-responsive means for engaging said members to produce substantially a sealed running joint at said surface.

3. In a system for passing a hot gaseous medium from a supply source to a remote point on an aircraft, a supply line comprising fixed conduits, a rotatable member for receiving the hot gaseous medium from said fixed conduits and spaced therefrom, and sealing means interposed between said fixed conduits and said rotatable member to sealably engage said conduits to said member in response to the elevated temperature of the hot gaseous medium passing through said conduits, member and sealing means.

4. In combination with an aircraft engine cooling fan wherein the blades are each provided with a passage therethrough, rotatable means having a passage therein connected to said blade passages for collecting a heated medium non-rotatable means disposed in spaced relation to said first named means for passing a heated medium thereto, and means carried by said second named means thermally expandable into sealing engagement with said first named means in response to the temperature of the heated medium passing through said several means.

5. In combination with an aircraft engine cooling fan wherein the blades are each provided with a passage therethrough, rotatable means having a passage therein connected to said blade passages for collecting a heated medium, fixed means disposed in spaced relation to said rotatable means for supplying a heated medium to said rotatable means, and means carried by said fixed means thermally expandable into running sealing engagement with said rotatable means in response to the temperature of the heated medium passing through said several means.

6. In a system for supplying a hot gaseous medium to a rotatable blade-carrying mechanism wherein the blades are each provided with a passage therethrough, a conduit, transfer means establishing a passage from said conduit to said blades for supplying a hot gaseous medium to said blades, said passage comprising a rotatable section and a fixed section disposed at times in spaced relation to each other, and means in the passage and responsive to the temperature of medium flowing therethrough to move said fixed and rotatable sections into sealing engagement with one another.

7. In a system for supplying a hot gaseous medium to a rotatable blade-carrying mechanism wherein the blades are each provided with a passage therethrough, transfer means establishing a passage from a conduit to the blades of a blade carrying mechanism for supplying a hot gaseous medium to the blades, said passage comprising a rotatable section and a fixed section disposed at times in spaced relation to each other, and means in the passage and responsive to the temperature of said medium passing therethrough to move said fixed and rotatable sections into sealing engagement with one another, said means comprising a bi-metal temperature responsive strip secured to one of said sections.

8. An impeller assembly comprising a rotor carrying blades each having an open passage therethrough, means within said rotor forming an annular passage common to all of said blades, a collector ring coaxial with said rotor having a plurality of apertures in communication with said annular passage, a conduit disposed opposite a portion of said collector ring in spaced relation thereto, a sealing ring through which said conduit discharges, sealably engageable with said collector ring, and temperature responsive force producing means adjacent one of said rings to urge said rings into contacting engagement with one another upon passage of a hot gaseous medium through said conduit, rings, and passage and around said temperature responsive means.

9. In combination with an impeller having blades each provided with a passage therethrough, rotatable means comprising a fluid intake common to said blades and adapted for collecting a heated fluid, fixed means opposite said rotatable means for conducting a heated fluid medium to said rotatable means, sealing means between said fixed means and rotatable means, secured to one of said means and normally out of engagement with the other of said means, and means interposed between said sealing means and the means to which said sealing means is secured, operative to move said sealing means into engagement with said other means in response to the elevated temperature of a heated fluid medium passing through said several means to form a closed passage leading to said blades.

10. In combination, an impeller comprising a rotor housing having a plurality of hollow fan blades associated therewith, an annular chamber within said housing common to said blades, a collector ring carried by said housing for receiving a hot gaseous medium for passage to said chamber, a stationary conduit having its open end disposed opposite and spaced from said collector ring for supplying a hot gaseous medium thereto, a plurality of concentrically arranged non-rotatable sealing rings yieldably disposed at the open end of said conduit and between which said conduit discharges, and temperature responsive means acting on said sealing rings to move said sealing rings into engagement with said collector ring in response to the elevated temperature of a hot gaseous medium passing through said conduit and rings.

11. In combination with an impeller having fan blades each provided with an open passage therethrough, rotatable means comprising an intake common to all of said blades for collecting a hot fluid medium, fixed means having an opening therein disposed opposite said rotatable means and spaced therefrom for supplying hot gaseous fluid to said rotatable means, annular sealing means secured to said fixed means and engageable at times with said rotatable means, and a temperature responsive device interposed between said fixed means and said sealing means to move said sealing means into engagement with said rotatable means in response to the elevated temperature of hot fluid medium passing through said several means to form a closed passage to said blades.

12. A rotor comprising a hollow annular housing, said housing defining an annular chamber, a seal ring on said housing exteriorly thereof and having a plurality of apertures in communication with said chamber, a conduit having its end spaced from and directed toward said seal ring, sealing means at the end of said conduit engageable at times with said seal ring, and temperature responsive means located in the path of a hot fluid medium passing through said conduit and operative to move said sealing means into engagement with said sealing ring.

13. A hot fluid transfer system between relatively rotatable conduit members comprising a seal ring rigid with one member and a coaxial seal ring flexibly carried by the other member, said rings being normally in spaced relation, and means responsive to the elevated temperature of hot fluid passing through said members to sealably engage said rings with one another.

14. A hot fluid transfer system between relatively rotatable conduit members comprising a seal ring rigid with one member and a coaxial seal ring flexibly carried by the other member, yieldable fluid impervious means joining said flexibly carried seal ring to said other member to prevent leakage of fluid from the zone between said coaxial seal ring and said other member, said rings being normally in spaced relation, and means washed by hot fluid when passed through said system and responsive to the heat of said fluid to sealably engage said rings with one another.

GEORGE A. DEAN.

REFERENCES CITED

The following references are of record in the file of this patent:

UNITED STATES PATENTS

| Number | Name | Date |
|---|---|---|
| 1,742,938 | Schumann | Jan. 7, 1930 |
| 1,763,574 | Williams | June 10, 1930 |
| 1,899,689 | Houston | Feb. 28, 1933 |
| 2,253,904 | Haug | Aug. 26, 1941 |
| 2,440,115 | Palmatier | Apr. 20, 1948 |